UNITED STATES PATENT OFFICE.

FREDERICK M. BECKET, OF NIAGARA FALLS, NEW YORK, ASSIGNOR TO ELECTRO METALLURGICAL COMPANY, OF NIAGARA FALLS, NEW YORK, A CORPORATION OF WEST VIRGINIA.

REFRACTORY ARTICLE AND PROCESS OF MAKING IT.

1,038,827.  Specification of Letters Patent.  Patented Sept. 17, 1912.

No Drawing.  Application filed June 23, 1911.  Serial No. 634,907.

*To all whom it may concern:*

Be it known that I, FREDERICK M. BECKET, a subject of the King of Great Britain, residing at Niagara Falls, in the county of Niagara and State of New York, have invented certain new and useful Improvements in Refractory Articles and Processes of Making Them, of which the following is a specification.

This invention relates to the production of a refractory composite article suitable for furnace linings, firebrick, crucibles, or the electrodes or resistors of electric furnaces.

The article comprises a body and an adherent facing reduced from said body, specifically a body of mixed titanium oxid and carbon, and an adherent facing of titanium carbid. In producing this article, a mixture of rutile, or other metal compound, and carbon, is molded to the desired shape. The surface of the article is then heated to the reduction-point of the oxid or compound, thereby reducing the surficial portion of the body and producing a carbid of the reduced metal. A porous facing may be produced at a relatively low temperature and then brought to a higher temperature, for example by an electric arc, to render the facing dense, homogeneous and uniform. When composite blocks or plates of this character are used for the linings of electric furnaces, they may be provided with the usual water-jackets, maintaining the back of the lining cool and preventing reduction from proceeding inward beyond the facing.

I claim:

1. A refractory article, comprising a body containing a reducible compound, and an adherent facing reduced from said body.

2. A refractory article, comprising an oxid body, and an adherent facing of a reduction-product of said oxid.

3. A refractory article, comprising a body of mixed metal oxid and carbon, and an adherent facing of a metal carbid reduced from said body.

4. A refractory article, comprising a body and a facing of titanium carbid distinct from but adherent to said body.

5. A refractory article, comprising a body of mixed titanium oxid and carbon, and an adherent facing of titanium carbid reduced from said body.

6. The process of producing a refractory article, which consists in superficially reducing the surface of a refractory body containing a reducible compound.

7. The process of producing a refractory article, which consists in superficially reducing and carburizing the surface of a refractory body containing a reducible compound.

8. The process of producing a refractory article, which consists in heating to the reduction-point the surface of a coherent body of a mixed metal compound and carbon.

9. The process of producing a refractory article, which consists in heating to the reduction-point the surface of a coherent body of a mixed metal compound and an excess of carbon.

10. A furnace having a lining the exposed portions of which consist of titanium carbid.

11. A furnace having a lining consisting of blocks having an adherent facing of titanium carbid.

In testimony whereof, I affix my signature in presence of two witnesses.

FREDERICK M. BECKET.

Witnesses:
J. N. DEINHARDT,
D. BURGESS.